June 29, 1937.  J. M. STRACHAN  2,085,397
MACHINE TOOL
Original Filed Dec. 1, 1933  3 Sheets-Sheet 1

INVENTOR
John M. Strachan
By Clindahl, Parker & Carlson,
ATTORNEYS

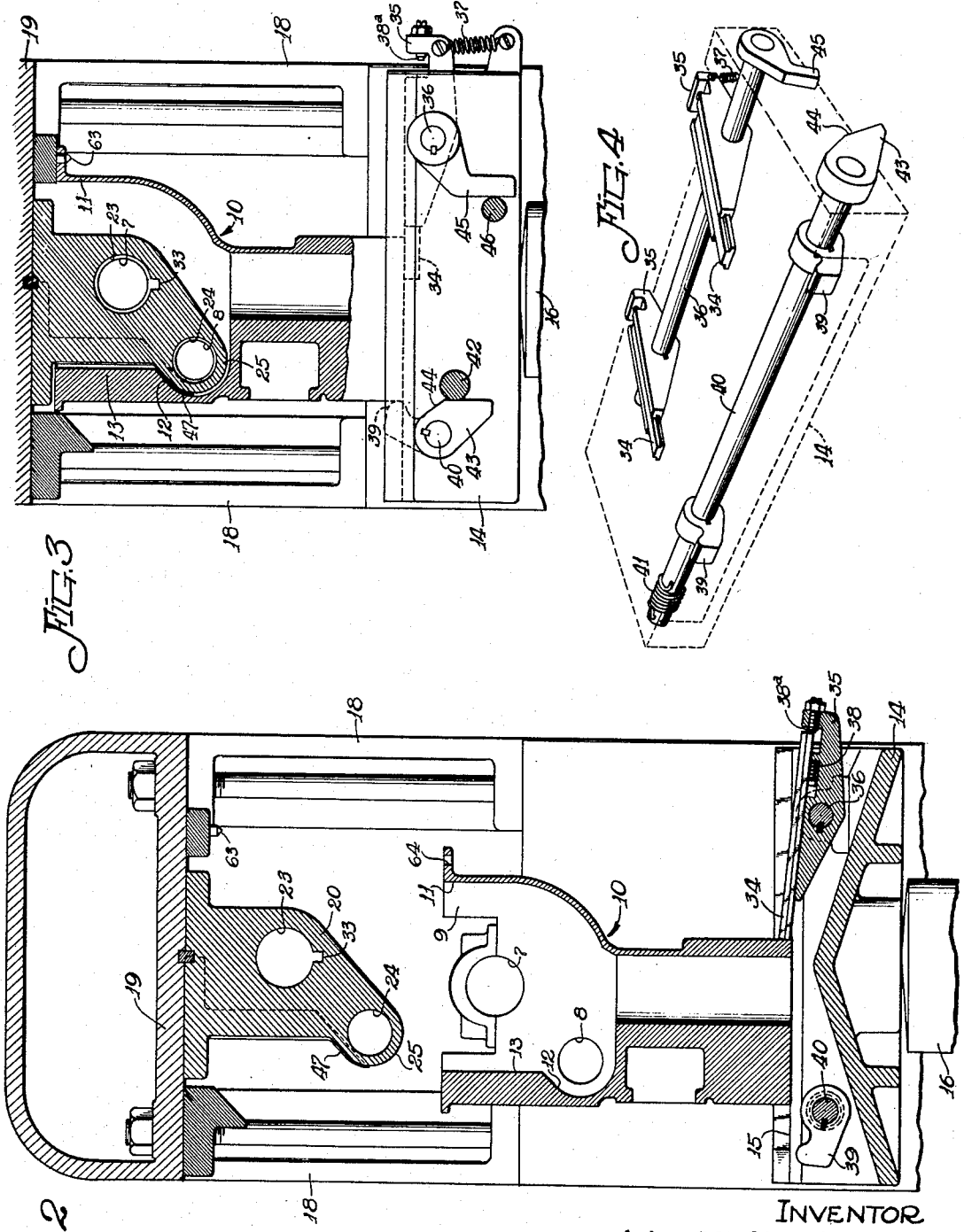

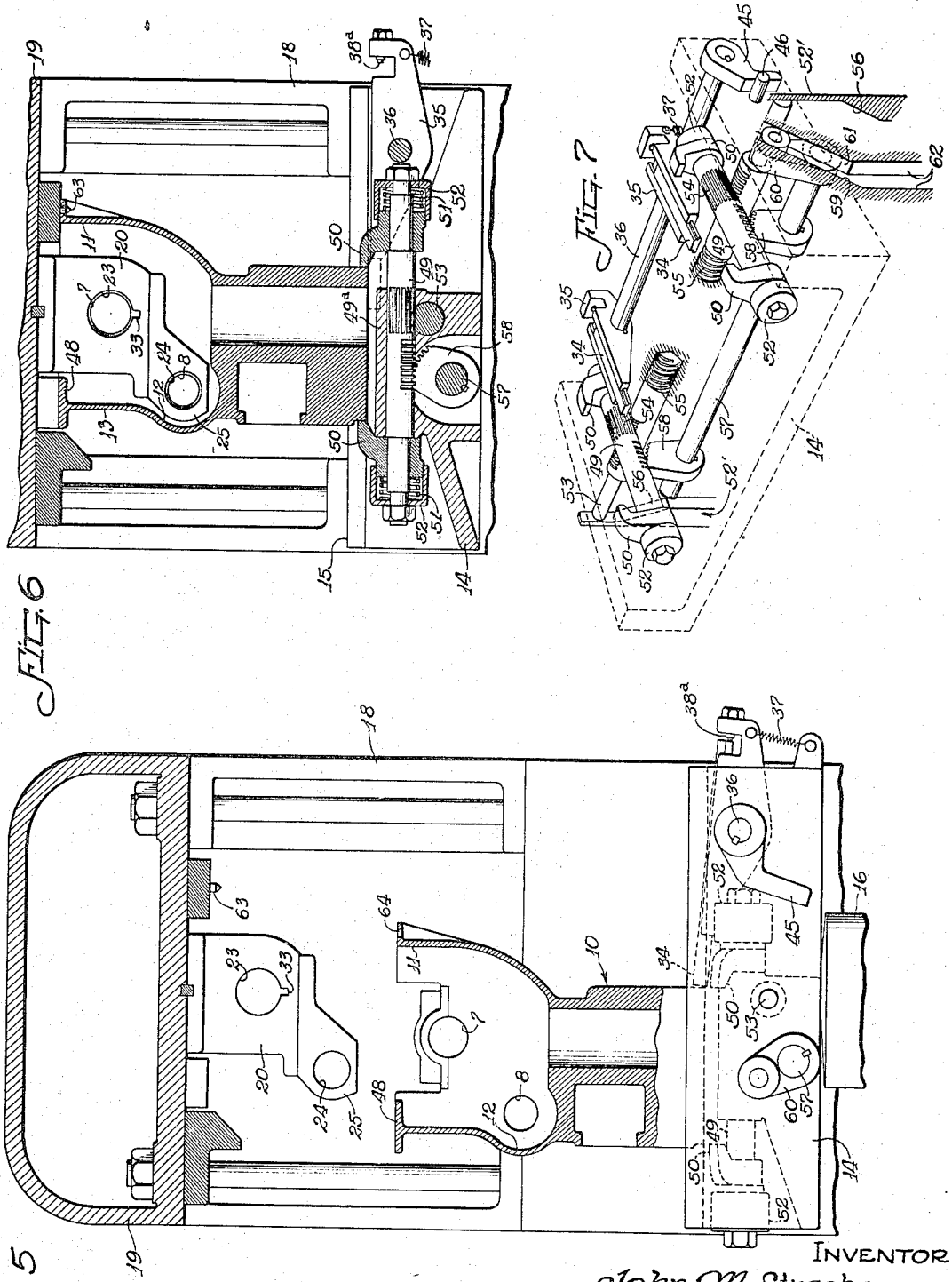

Patented June 29, 1937

2,085,397

UNITED STATES PATENT OFFICE 2,085,397

MACHINE TOOL

John M. Strachan, Rockford, Ill., assignor to The Ingersoll Milling Machine Company, Rockford, Ill., a corporation of Illinois Application December 1, 1933, Serial No. 700,500
Renewed December 12, 1936

24 Claims. (Cl. 77—3)

This invention relates in general to the relative positioning of the work and tool supports in machine tools preparatory to the machining operation and more particularly to the positioning of an internal combustion engine block for drilling, boring or reaming of the shaft bearing holes therein.

According to present practice, the shaft bearing recesses of engine blocks are machined by tools rotatable in bearings disposed adjacent the respective recesses to be machined and carried on the ends of arms which project into the bottom or crank case opening of the block transversely of the axes of the holes to be machined. Thereafter, machining is effected by relative movement between the block and the tools in a direction axially of the holes.

The primary object of the present invention is to provide a machine of the above general character having a novel mechanism for relatively positioning the tool supports and an engine block even though the bearing recesses to be machined are so positioned relative to the crank case opening of the block as to prevent entry of the tool supports in a direction perpendicular to the axes of the recesses.

A more detailed object is to provide a novel mechanism for moving an engine block and tool supports relative to each other so that the tool supports first enter the bottom opening in the block along a path offset with respect to the recesses to be machined and then are brought into proper alinement with the recesses by relative movement in a direction transversely of the first mentioned movement.

The invention also resides in the novel construction of the mechanism by which the positioning movements above mentioned are effected automatically and in timed relation to the entry of the tool supports.

Other objects and advantages of the invention will become apparent from the following detailed description taken in connection with the accompanying drawings, in which Figure 1 is a horizontal side elevation partially in section of a machine tool embodying the features of the present invention.

Fig. 2 is a section taken along the line 2—2 of Fig. 1 with the parts in loading position.

Fig. 3 is a section taken along the line 3—3 of Fig. 1 with the parts in working position.

Fig. 4 is a perspective view of certain of the work positioning parts.

Figs. 5, 6 and 7 are views similar to Figs. 2, 3 and 4 showing a modified form of the invention.

Figure 1:
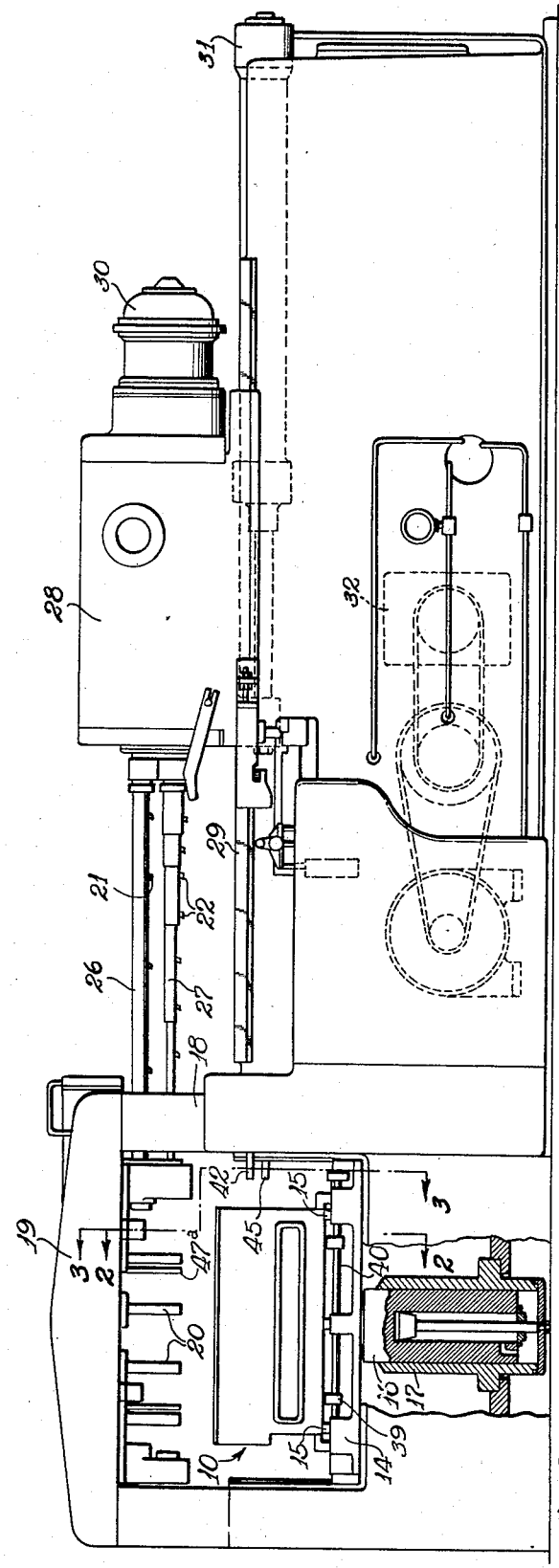

For convenience of illustration, the invention as shown in the drawings is embodied in a machine tool arranged to bore or ream the crank and cam shaft holes 7 and 8 in the cross webs or bridges 9 of an internal combustion engine block 10. The cam shaft holes 8 are located on the valve side of the block and, as is frequently the case in the blocks of the kind shown, these holes are offset outwardly relative to the crank case opening 11 and at least a portion of the hole is disposed in the vertical plane of a ledge 12 which merges with one side wall 13 defining the crank case opening.

In the machine shown in the drawings for purposes of illustration, the shaft bearing holes are machined while the block is supported in inverted position upon a vertically movable table or platen 14 having skids 15 on its upper surface onto which the block may be slid horizontally from one side of the machine when the platen is in its lower or loading position. Herein, the platen is mounted on the upper end of a piston 16 reciprocable in a vertical cylinder 17 within the base of the machine. By controlling the admission of pressure fluid to the cylinder and the release therefrom, the platen may be raised and lowered as desired.

Stationarily mounted above the platen 14 through the medium of a suitable frame structure 18 upstanding from the base is a support 19 having rigid therewith a plurality of downwardly projecting parallel projections or arms 20 spaced relative to each other to correspond to the spacing of the holes to be machined and serving as bearing supports for the tools 21 and 22 by which the respective crank and cam shaft recesses are machined. During the machining operation, the tools 21 are rotatably mounted in bearing holes 23 on the arms while the tools for the cam shaft bearing recesses are rotatably supported in holes 24 formed in the lower end portions 25 of the arms, which portions extend laterally relative to the arms proper. The overall horizontal dimension of the arms 20 is less than the width of the bottom opening 11 so that when the block is positioned properly on the platen, the arms 20 will enter the crank case opening as the block is raised vertically. Moreover, the horizontal width of the arms is such that after the lower ends 25 have entered the crank case opening to a point below the level of the ledges 12, the bearing holes 8 may, by relative horizontal movement between the block and the arms, be brought into correct alinement with the cam shaft recesses to be bored.

While the different recesses may be machined by tools permanently mounted on the respective bearing arms 20, the tools 21 and 22 are, in the present instance, carried by two bars 26 and 27 rotatably supported by a head 28 which is arranged to be reciprocated back and forth along ways 29 of the bed with the desired rapid approach, feed and rapid return movements. Power for rotating the tools is supplied by an electric motor 30 and the head may be advanced by an hydraulic actuator 31 supplied with pressure fluid by a motor driven pump 32 which may also supply the fluid for raising the work platen 14.

As disclosed in the application aforementioned, the tools are disposed in alinement on their respective bars and the bearing holes on the arms 20 are formed with radial notches 33 through which the tools will pass when the head 28 is advanced with the bars held against rotation and disposed in proper angular positions. Such advance occurs while the block is held in a position in which the recesses to be bored are slightly out of alinement with the boring bars so that bars may be projected through the rough recesses, the overall diameters of the bars and tools being less than that of said recesses. Then, after the tools on each bar have been brought adjacent the respective webs 9 to be bored thereby, the block may be shifted into its final working position and clamped under hydraulic pressure against the overhead support 19 and there maintained while the tools are fed into the work.

To facilitate location of the block on the platen 14 so that the crank case opening will be alined with the arms 20, stops are positioned on the platen for engagement with the lower end of the block as it is slid onto the platen in loading. These stops are in the form of bars 34 slidably mounted on arms 35 which are fast on a rockshaft 36 on the platen and urged upwardly by springs 37. A compression spring 38, acting between the arms 35 and the stop bar thereon, urges the bar forwardly into a limit position.

The present invention contemplates the provision, in a machine of the above general character, of means operating in timed relation to the entry of the tool-supporting arms 20 into the crank case opening to shift said arms and the block laterally relative to each other and bring the holes 24 in the arms into axial alinement with the recesses 8 to be bored as the arms pass beyond the ledges 12. In the form shown in Figs. 2, 3 and 4, this means is actuated by power derived from relative vertical movement between the work and tool supports and includes a pair of crank arms 39 fast on a rockshaft 40 pivotally mounted on the loading side of the platen. A torsion spring 41 acts on the rockshaft to swing the same in a direction to maintain the crank arms below the surface along which the block is slid in loading. As the platen approaches its uppermost position and after the ends of the arms 20 have properly passed the upper part of the ledges 12, a stationary pin 42 (Fig. 3) projecting horizontally from the frame 18 adjacent the end of the rockshaft 40 engages and acts as a cam on an arm 43 on the rockshaft, depressing the latter and swinging the crank arms 39 upwardly against the block on the platen and then horizontally into the position shown in Fig. 3 thereby shifting the block horizontally along the platen skids. It will be observed that the vertical position of the cam pin 41 determines the point at which it acts while the shape of the surface 44 on the arm 43 determines the position to which the block is shifted, this shape being such that the axes of the recesses 8 and the bearing holes 24 are brought substantially into a common vertical plane.

The loading and positioning operation is as follows assuming that the platen is in its lowermost position, the cranks 39 being then retracted downwardly as shown in Fig. 2 and the stops 34 being swung upwardly. First, a block in inverted position is slid horizontally along the platen skids over the arms 39 until the stops 34 have been engaged and shifted against the action of the springs 38 into engagement with stops 38ª on the arms 35. In this position, as shown in Fig. 2, the side wall 13 of the crank case is disposed outside of the outermost edge of the lower ends 25 of the arms 20 so that the arms may enter the crank case opening as the block is raised. Pressure fluid is then admitted to the cylinder 17 to raise the platen with the block thereon.

During the upward movement of the platen with the block positioned as shown in Fig. 2, an arm 45 on the rockshaft 36 encounters a stationary pin 46 on the machine frame 18 and is depressed by this pin so as to swing the arms 35 downwardly. As the stop bars are thus lowered below the lower edge of the block, they are projected beneath the block by the springs 38.

In the final upward movement of the block after the upper edges of the ledges 12 have passed the outermost points on the end portions 25 of the arms 20 and after the stop bars 34 have been retracted as above described, the arm 43 on the rockshaft 40 encounters the cam pin 42 and in the continued upward motion, the cranks 39 are swung from the position shown in Fig. 2 to that shown in Fig. 3. Movement of the cranks after the arms 39 have engaged the block serves to slide the block horizontally over the stop bars 34 until the axes of the shaft recesses 8 and the corresponding bearing holes 24 are disposed in the same vertical plane as shown in Fig. 3. In this relation, the ends 25 of the arms 20 will extend around the ledges 12. After such vertical alinement of the shaft recesses and the bearing holes, the upward movement of the platen may continue until the axes of the recesses and holes have been brought into exact coincidence as will later appear.

After the shaft recesses have been machined while the block is clamped in elevated position against the support 19, the pressure fluid is released from the cylinder 17 allowing the platen to be lowered. During this movement, the ledges 12 on the block encounter cam surfaces 47 on separate brackets 47ª rigid with and projecting downwardly from the support 19 adjacent certain of the bearing arms 20. As the ledges slide down these surfaces, the block 10 is tilted relative to the platen through an angle sufficient to enable the arms 20 to pass out of the crank case opening 11. The cam pins 42 and 46 are also rendered ineffective so that the cranks 39 and the stop arms 35 may, under the action of their springs, assume the proper positions for loading of the next block. Until the finished block is removed from the platen, the stop bars 34 remain disposed below the block so that the latter may be slid horizontally off from the platen in the same direction as it was loaded.

Where the shape of the ledges 12 on the block or the degree of offset between these ledges and the cam shaft recesses is such as to prevent tilting of the block and proper withdrawal of the tool supporting arms 20 as the platen is lowered, the invention also contemplates the provision of means for positively and bodily shifting the block back to its initial position relative to the platen in timed relation to the downward movement of the platen. Such a means is illustrated in Figs. 5 to 7 in conjunction with a block which, in addition to the ledges 12, has an inturned flange 48 on the crank case around which the tool bearing support must be extended. This positioning means may include two parallel rockshafts 49 mounted in bearings 49ª on the platen 14 transversely of and disposed beneath a block on the platen and each having keyed thereon two lugs 50 spaced apart a distance equal to the width of the cylinder end of the block and so located on their shafts that they may be swung upwardly along and substantially in contact with opposite sides of the cylinder head when the block is positioned on the platen with one side thereon in abutment with the stops 34. Compression springs 51 acting between the lugs 50 and caps 52 on the ends of the shafts permit a slight degree of axially yielding of the lugs relative to their supporting rockshafts.

The rockshafts 49 are oscillated in timed relation to the movement of the platen 14. This is accomplished by stationary cams 52' engageable with the ends of rack bars 53 slidably mounted on the platen and each having teeth meshing with gear teeth 54 on each of the rockshafts. A spring 55 urges each rack bar in a direction to swing the associated lugs 50 upwardly. The cams 52' are secured to the frame 18 at opposite ends of the block and each has an inclined surface 56 which acts on one rack bar in the downward movement of the platen, camming the rack bar inwardly against the action of its spring 55 and thereby retracting the lugs 50 below the skid surfaces. During the upward movement of the platen, the rack bar followers ride from the cam surfaces 56 onto dwell surfaces thereby permitting the springs 55 to act and oscillate the lugs upwardly into engagement with opposite sides of the block.

Lateral shifting of the block relative to the platen to bring the shaft recesses to be bored into vertical alinement with the tool bearing holes 24 is produced by endwise movement of the shafts 49 after the ledges 12 have passed the lower ends of the bearing arms 20 and while the lugs 50 are engaging the block. For this purpose, a rockshaft 57 rotatably mounted on the platen and extending transversely of the shafts 49 has gear segments 58 thereon meshing with rack teeth on the shafts 49 so that by rocking the shaft 57 in opposite directions, the block will be shifted relative to the platen between the position shown in Fig. 5 in which the arms 20 are alined with the crank case opening 11 and the position shown in Fig. 6 wherein the lower ends 25 of the arms 20 are disposed beneath the ledges 12 and the axis of the bearing holes 24 is alined vertically with the axis of the shaft bearing holes 8 to be bored. Such oscillation of the shaft 57 is produced by a cam 59 stationarily mounted on the machine frame 18 and operating upon a roller on the free end of a follower arm 60 fast on the adjacent end of the shaft 57. Reverse oscillation of the latter shaft is produced by a cam surface 61.

The gauging stops 34 are operated in the manner above described, being retracted beneath the block prior to or during the upward motion of the lugs 50 and released to the action of their springs 37 during the downward movement of the block after the machining operation.

When the platen is in its lowermost position, the roller on the arm 60 is disposed between vertical cam surfaces 62 which position the lugs 50 as shown in Fig. 5. Now as the platen rises but after the lugs 50 have been swung upwardly and the ledges 12 on the block have risen above the ends 25 of the bearing arms 20, the follower arm rides along the inclined surface 59 rocking the shaft 57 in a direction to shift the block horizontally along the platen and bring the axes of the holes 24 and the shaft recesses 8 into vertical alinement. In the downward movement of the platen after the machining operation has been completed, the block is positively shifted reversely along the platen as the follower 60 rides along the cam surface 61 into the dwell portion 62. The block is thus positioned so that the arms 20 will pass out of the crank case opening without engaging the walls of the block. Then in the continued downward movement of the platen, the lugs 50 are retracted by the cams 56 so that the block may be slid off from the platen over the stops 34 which are then retracted and held by the block against upward movement.

It will be observed that the automatic fixtures above described are actuated by the power applied to elevate the work-supporting platen and that the blocks are positioned automatically and in proper timed relation to the relative movements between the block 10 and the tool supports 20. While substantial accuracy may be obtained in the lateral positioning of the block relative to the tools, the mechanisms above described need not be relied upon to effect the final positioning of the block. This may, if desired, be accomplished by the usual tapered dowel pins 63 which project downwardly from the support 19 against which the block is pressed during the machining operation and are arranged to enter dowel holes 64 in the crank case flange in the final upward movement of the block. Thus, when the block is clamped against the underside of the support 19, the tool bearings are accurately positioned relative to the block recesses to be machined.

I claim as my invention:

1. A machine tool for machining the cam shaft bearing recesses in an engine block in which said recesses are disposed in the vertical plane of a ledge on the internal wall of the block, said machine tool having, in combination, a table having an upper surface along which a block may be slid horizontally in inverted position, a gauging stop disposed in the path of said block when slid onto said table, a support above said table having downwardly extending projections spaced according to the axial spacing of said recesses and alined with the crank case opening in said block when the latter is disposed against said stop, each of said projections having a laterally extending lower end portion adapted to project around said ledge when the projection is disposed adjacent one inner side wall of said block and said end portions each having a tool bearing hole offset horizontally from said recesses when said block is initially positioned against said stop, power actuated means for effecting relative vertical movement between said table and said support whereby to cause said projections to enter said opening, power actuated means operated automatically in timed relation to said vertical movement after said end portions have been brought opposite said ledges to shift said block horizontally a distance sufficient to aline said recesses and said tool bearing holes vertically, and means to release said stop and permit shifting of said block by said last mentioned means.

2. A machine tool for machining the cam shaft bearing recesses in an engine block in which said recesses are offset outwardly from the crank case opening of the block, said machine tool having, in combination, a table upon which a block may rest in inverted position, a support above said table having downwardly extending projections spaced according to the axial spacing of said recesses each having a lower end portion with a tool bearing hole extending parallel to said recesses, said projection being adapted to enter said crank case opening when said hole is offset horizontally from said recesses, power actuated means for effecting relative vertical movement between said table and said support whereby to cause said projections to enter said opening, and means capable of being operated only after said projections have entered the block and said holes approach the level of said recesses, said last mentioned means acting when operated to shift the block and projections horizontally relative to each other in a direction and through a distance sufficient to vertically aline said recesses and said tool bearing holes.

3. A machine tool for machining the cam shaft bearing recesses in an engine block in which said recesses are offset outwardly from the crank case opening of the block, said machine tool having, in combination, a table upon which a block may rest in inverted position, a support above said table having downwardly extending projections spaced according to the axial spacing of said recesses each having a laterally extending lower end portion with a tool bearing hole extending parallel to said recesses, said projection being adapted to enter said crank case opening when said hole is offset horizontally from said recesses, power actuated means for effecting relative vertical movement between said table and said support whereby to cause said projections to enter said opening, and power actuated cam means operated by and in timed relation to said vertical movement after said projections have entered the block to a predetermined distance to shift the block and projections horizontally relative to each other in a direction and through a distance sufficient to vertically aline said recesses and said tool bearing holes.

4. A machine tool for machining the cam shaft bearing recesses in an engine block in which said recesses are offset outwardly from the crank case opening of the block, said machine tool having, in combination, a table with an upper surface along which a block may be slid in inverted position, a support above said table having downwardly extending projections spaced according to the axial spacing of said recesses each having a laterally extending lower end portion with a tool bearing hole extending parallel to said recesses, said projection being adapted to enter said crank case opening when said hole is offset horizontally from said recesses, power actuated means for effecting relative vertical movement between said table and said support whereby to cause said projections to enter said opening, and a power actuated member engageable directly with said block and operated automatically after said projections have entered the block to a predetermined distance to shift the block horizontally relative to said table in a direction and through a distance sufficient to vertically aline said recesses and said tool bearing holes.

5. A machine tool for machining the cam shaft bearing recesses in an engine block in which said recesses are offset outwardly from the crank case opening of the block, said machine tool having, in combination, a table upon which a block may rest horizontally while in inverted position, a support above said table having downwardly extending projections spaced according to the axial spacing of said recesses each having a lower end portion with a tool bearing hole extending parallel to said recesses, said projection being adapted to enter said crank case opening when said hole is offset horizontally from said recesses, a stop yieldably urged in a direction opposite to that of loading of the block and operable to yield and limit the horizontal movement of said block at a point where said projections are alined with said opening, power actuated means for effecting relative vertical movement between said table and said support whereby to cause said projections to enter said opening, means operable in such movement to retract said stop out of blocking position relative to the block, means operated automatically after said projections have entered the block to a predetermined distance and said stop has been retracted to shift said block and projections horizontally relative to each other in the direction of said stop and through a distance sufficient to vertically aline said recesses and said tool bearing holes.

6. A machine tool for machining the cam shaft bearing recesses in an engine block having, in combination, two opposed supports mounted for relative movement toward and away from each other, one of said supports being adapted to carry said block with the crank case opening therein facing the other support, a projection rigid with said last mentioned support and having a bearing for rotatably supporting the tool by which one of said recesses is machined, means for moving said supports toward each other with the block positioned for entry of said projection into said opening, means by which said block and said projection may be shifted laterally of the direction of said movement for alining the axes of said bearing and said recess only after said projection has entered the block a predetermined distance, and means for shifting the block and projection relative to each other in a reverse direction during movement of said supports away from each other.

7. A machine tool for machining the cam shaft bearing recesses in an engine block having, in combination, two opposed supports mounted for relative movement toward and away from each other, one of said supports being adapted to carry said block with the crank case opening of the latter facing the other support, a projection rigid with the latter support and adapted to enter said opening, said projection having a bearing for a rotary tool with its axis extending parallel to the axis of one of said recesses, means for moving said supports toward each other with said axes offset laterally relative to each other in the direction of relative movement of said supports, and cam means actuated by said relative movement after said projection has entered the block to a predetermined distance, said cam means acting to shift said block and said projection relative to each other laterally of said relative movement and through a distance sufficient to aline said axes in the direction of said relative movement.

8. A machine tool for machining the cam shaft bearing recesses in an engine block having a ledge in one side wall in the vertical plane of said recesses, said machine tool having, in combination, two opposed supports mounted for movement toward and away from each other, one of said supports being adapted to carry said block with the crank case opening thereof facing the other support, a projection on said other support adapted to enter said opening and having an end portion offset in the direction of said ledge whereby to project around the latter when the projection is disposed close to one side of said opening, said end portion having a tool supporting bearing therein with its axis extending parallel to the axes of said recesses, power operated means for moving said supports toward each other with said block positioned to permit entry of said projection through said crank case opening, and means responsive to the relative movement between said supports and operable to shift said block and projection relative to each other and laterally of the direction of said movement whereby to bring said axes substantially into a common plane, said last mentioned means operating after said end portion has passed beyond interfering relation with said ledge.

9. A machine tool for machining the cam shaft bearing recesses in an engine block having a ledge in one side wall in the vertical plane of said recesses, said machine tool having, in combination, two opposed supports mounted for movement toward and away from each other, one of said supports being adapted to carry said block with the crank case opening thereof facing the other support, a projection on said other support adapted to enter said opening and having an end portion offset in the direction of said ledge whereby to project around the latter when the projection is disposed close to one side of said opening, said end portion having a tool supporting bearing therein with its axis extending parallel to the axis of said recesses, means by which said supports may be moved toward each other with said block positioned to permit entry of said projection through said crank case opening, and means operable only when said end portion has moved into said opening a predetermined distance to bodily shift said block and projection laterally relative to each other whereby to bring said axes into a common plane with said end portion extending around said ledge.

10. A machine tool for machining the bearing recesses of an engine block having, in combination, a table having a horizontal surface along which said block may be slid horizontally in inverted position, a member movably mounted on said table for engagement with a side wall of said block and retractible below said surface whereby to permit the block to be slid thereover, a support disposed above said table and having tool supporting projections extending downwardly therefrom to enter the crank case opening of said block, power actuated means for effecting relative vertical movement between said support and said table, and means operating automatically by said vertical movement to move said member upwardly into engagement with said block and then laterally to shift the block horizontally relative to said table.

11. A machine tool for machining the bearing recesses of an engine block having, in combination, a table having a horizontal surface along which said block may be slid horizontally in inverted position, a member movably mounted on said table for engagement with a side wall of said block and retractible below said surface whereby to permit the block to be slid thereover, a support disposed above said table and having tool supporting projections extending downwardly therefrom to enter the crank case opening of said block, power actuated means for effecting relative vertical movement between said support and said table, and cam means rigid with said support and operable in said relative vertical movement to move said member into engagement with said block and then horizontally whereby to shift the block relative to said table.

12. A machine tool of the character described having, in combination, a table having an upper surface for supporting an engine block in inverted position, a pair of lugs carried by said table beneath said surface and spaced to correspond to the dimensions of said block, said lugs being mounted for upward movement to positions adjacent opposite side walls of the block and for bodily horizontal movement to shift the block along said surface in either direction, cam means for moving said lugs vertically, and independent cam means for shifting the lugs horizontally.

13. A machine tool for machining the bearing recesses of an engine block having, in combination, a table having a horizontal surface along which said block may be slid horizontally in inverted position, a rocker member mounted on said table for bodily movement transversely of the block and also to swing vertically into and out of engagement with one side wall of the block about a horizontal axis extending transversely of the block, power actuated means for raising the table, and means operated in the upward movement of said table to swing said member upwardly and then shift the same bodily in a horizontal direction whereby to shift the block horizontally relative to the table.

14. A machine tool for machining the bearing recesses of an engine block having, in combination, a table having a horizontal surface along which said block may be slid horizontally in inverted position, a rocker member mounted on said table to turn about a horizontal axis parallel to and extending along the lower side edge of said block, said member being retractible below said surface whereby to permit the block to be slid over the member, and power actuated means for swinging said member upwardly into engagement with a side of said block and then laterally whereby to shift the block horizontally relative to said table.

15. For machining an annular recess disposed within a hollow work piece and accessible from a side opening therein, a machine tool having, in combination, two opposed supports mounted for relative movement toward and away from each other, one of said supports being adapted to carry said work piece with said opening facing the other support, a projection rigid with said last mentioned support and having a bearing for rotatably supporting the tool by which said recess is machined, power actuated means for moving said supports toward each other with the work piece positioned for entry of said projection into said opening in laterally offset relation to said recess, and power actuated means operating automatically in timed relation to relative movement of said supports after entry of said projection therein with the workpiece so positioned to relatively shift said work piece and projection laterally in one direction relative to each other and a distance sufficient to bring said recess and bearing into alinement with respect to the direction of entry of the bearing.

16. A machine tool for machining the cam shaft bearing recesses in an engine block having, in combination, two opposed supports mounted for relative movement toward and away from each other, one of said supports being adapted to carry said block with the crank case opening therein facing the other support, a projection rigid with said last mentioned support and having a bearing for rotatably supporting the tool by which one of said recesses is machined, power actuated means for moving said supports toward each other with said block positioned with the axes of said tool bearing and the recess to be machined offset a predetermined distance so as to permit of entry of said projection through said opening, and power actuated means operating automatically in timed relation to relative movement of said supports to relatively shift said block and projection laterally of their approaching movement to bring said axes into alined relation, said last mentioned means acting to shift the block and projection in the opposite direction upon movement of the supports away from each other.

17. A machine tool for machining the cam shaft bearing recesses in an engine block in which said recesses are so spaced relative to the defining edge wall of the crank case opening as to prevent direct entry of a tool support through said opening into alinement with one of said recesses, said machine tool comprising two opposed supports mounted for relative movement toward and away from each other, a rigid arm projecting from one of said supports and having a bearing for a rotatable cutting tool for machining one of said recesses, the other of said supports being adapted to carry said block with the crank-case opening facing the tool support and with the axis of said bearing offset inwardly from the axis of said recess for entry through said opening, means by which said supports may be moved toward each other, and means movable relative to said arm in a direction laterally of said bearing axis and operable after said bearing has passed through said opening to effect relative lateral shifting between said arm and said block in a direction and through a predetermined distance sufficient to bring said bearing and said recess into alined relation.

18. A machine tool for machining the cam shaft bearing recesses in an engine block having, in combination, a support providing a clamping abutment, a rigid projection extending from said support and providing a bearing for a rotary cutting tool for machining one of said recesses, a work support mounted opposite said first mentioned support and adapted to support said block in a position for entry of said projection through the crank-case opening of the block with the axis of said bearing disposed parallel to but offset laterally from the axis of said recess, power actuated means for moving one of said supports toward the other to enter said projection in said opening and clamp the block against said abutment, and means movable relative to said projection in a direction laterally of said bearing axis and operating automatically in timed relation to the relative approaching movement between said supports and prior to engagement of the block with said abutment to relatively shift the block and projection laterally a distance sufficient to bring said axes into alinement when said block is clamped against said abutment.

19. For machining an annular recess disposed within a hollow work piece and accessible from a side opening therein, a machine tool having, in combination, two opposed supports mounted for relative approaching movement toward and away from each other, one of said supports being adapted to carry said work piece with said opening facing the other support, a projection on said last mentioned support and having a bearing for rotatably supporting a tool by which said recess may be machined, means for locating said work piece on its support with said projection alined with said opening but with the axes of said bearing and said recess offset laterally of the direction of said approaching movement, means for moving one of said supports toward the other with the work piece thus positioned, and power actuated means operating automatically after said projection has passed said opening to relatively shift said work piece and projection laterally of the direction of approaching movement a distance sufficient to aline said recess and bearing axes in such direction.

20. For machining a part on the interior of a hollow work piece having a side opening therein, a machine tool having, in combination, two opposed supports mounted for relative approaching movement toward and away from each other, one of said supports being adapted to carry said work piece with said opening facing the other support, a projection on said last mentioned support having a bearing for rotatably supporting a tool by which said part may be machined, positively acting means by which said work piece may be located on its support with said projection alined with said opening but with the axis of said bearing offset laterally from said part in the direction of said approaching movement, means for moving one of said supports toward the other with the work piece thus positioned, and power actuated means operable after said projection has passed said opening and out of interfering relation therewith to relatively shift said work piece and projection laterally a distance sufficient to aline said bearing axis and said part in the direction of said approaching movement.

21. For machining a part on the interior of a work piece accessible from a side opening in the work piece, a machine tool having, in combination, two opposed supports mounted for relative approaching movement toward and away from each other, one of said supports being adapted to carry said work piece with said opening facing the other support, a projection on said last mentioned support having a bearing for rotatably supporting a tool by which said portion may be machined, power actuated means for moving one of said supports toward the other with the work piece alined with said opening but with said bearing offset from said part laterally of the direction of said approaching movement, an abutment engageable by said work piece when said bearing has entered to a position opposite said part, dowel means engageable with said work piece to effect accurate positioning thereof in the approach of the work piece to said abutment, and power operated means movable relative to one of said supports and operable automatically during said approaching movement and after said bearing has passed through said opening but before engagement of the work piece and dowel means to relatively shift said work piece and projection laterally and bring said bearing and said part into alined relation.

22. For machining a part on the interior of a work piece accessible from a side opening in the work piece, a machine tool having, in combination, two opposed supports mounted for relative approaching movement toward and away from each other, one of said supports being adapted to carry said work piece with said opening facing the other support, a projection on said last mentioned support having a bearing for rotatably supporting a tool by which said portion may be machined, power actuated means for moving one of said supports toward the other with the work piece alined with said opening but with said bearing offset from said part laterally of the line of said approaching movement, means movable relative to at least one of said supports after said projection has passed through said opening and out of interfering relation with the sides thereof and operable when actuated to relatively shift said work piece and projection laterally, and means for positively gauging the extent of such lateral movement to bring said bearing and said part into position for operation of said tool on said part.

23. For machining a part on the interior of a work piece accessible from a side opening in the work piece, a machine tool having, in combination, two opposed supports mounted for relative approaching movement toward and away from each other, one of said supports being adapted to carry said work piece with said opening facing the other support, a projection on said last mentioned support having a bearing for rotatably supporting a tool by which said portion may be machined, means for moving one of said supports toward the other with the work piece alined with said opening but with said bearing offset from said part laterally of the direction of said approaching movement, and means operating automatically after said projection has passed through said opening and out of interfering relation with the sides thereof to relatively shift said work piece and projection laterally to bring said bearing into working position opposite said part, said last mentioned means acting automatically upon retraction of said supports to shift said work piece and projection reversely out of interfering relation.

24. For machining a part disposed within a hollow work piece and accessible from a side opening therein, a machine tool having, in combination, two opposed supports mounted for relative approaching movement toward and away from each other, one of said supports being adapted to carry said work piece with said opening facing the other support, a projection on said last mentioned support having a portion for rotatably supporting a tool by which said part may be machined and adapted to enter said opening only when offset laterally in the direction of said approaching movement, power actuated means for moving one of said supports toward the other with the work piece and said projection in such offset position, and power actuated means operable after said tool supporting portion has passed said opening to relatively shift said work piece and projection laterally a distance sufficient to locate said part and tool supporting portion for operation of said tool on said part.

JOHN M. STRACHAN.